(12) United States Patent
Majcher et al.

(10) Patent No.: US 7,636,866 B2
(45) Date of Patent: Dec. 22, 2009

(54) SITUATIONAL AWARE OUTPUT CONFIGURATION AND EXECUTION

(75) Inventors: Gregory A. Majcher, Broadview Heights, OH (US); Steven P. Blech, Twinsburg, OH (US); John P. Caspers, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1203 days.

(21) Appl. No.: 10/771,891

(22) Filed: Feb. 4, 2004

(65) Prior Publication Data

US 2004/0193963 A1   Sep. 30, 2004

Related U.S. Application Data

(63) Continuation of application No. 09/574,982, filed on May 19, 2000, now Pat. No. 6,701,462.

(51) Int. Cl.
*G06F 11/00* (2006.01)
(52) U.S. Cl. .......................................................... 714/4
(58) Field of Classification Search .................. 714/4, 714/26, 43
See application file for complete search history.

(56) References Cited

U.S. PATENT DOCUMENTS 6,513,129 B1 *   1/2003   Tentij et al. .................... 714/4
6,598,106 B1 *   7/2003   Grieshaber et al. .......... 710/305

\* cited by examiner

*Primary Examiner*—Bryce P Bonzo
(74) *Attorney, Agent, or Firm*—Turocy & Watson LLP; R. Scott Speroff

(57) ABSTRACT

A method and apparatus are provided which allow a user to define an output device behavior in a variety of status and/or event circumstances via creating a binding or logical connection between a logic function and one or more status/event indicators. The method provides for user-defined output behavior through linking a logical function with system and module status/event indicators, whereby the output value may be determined according to the status/event indicators and user-defined function blocks. Also disclosed is an output device with an output providing an output signal according to an output value, a communication interface adapted to receive messages from a network, an indicator adapted to receive message information from a network and providing indicator data, and a logic unit which receives message information from the network, indicator data from the indicator, and which performs a logic function. The logic unit selectively provides the output value to the output according to one of the message information and the logic function.

11 Claims, 6 Drawing Sheets

SITUATIONAL AWARE OUTPUT CONFIGURATION AND EXECUTION

CROSS REFERENCE TO RELATED APPLICATION(S)

This application is a continuation application of U.S. patent application Ser. No. 09/574,982 filed May 19, 2000 now U.S. Pat. No. 6,701,462, entitled SITUATIONAL AWARE OUTPUT CONFIGURATION AND EXECUTION. The entirety of which is incorporated herein by reference.

TECHNICAL FIELD

The present invention relates to the art of industrial controllers, and more particularly to a method and apparatus for providing an output value to an output device.

BACKGROUND OF THE INVENTION

Industrial controllers are special purpose computers used for controlling industrial processes, manufacturing equipment, and other factory automation. In accordance with a control program, the industrial controller measures one or more process variables or inputs reflecting the status of a controlled process, and changes outputs effecting control of the process. The inputs and outputs may be binary, (e.g., on or off), as well as analog inputs and outputs assuming a continuous range of values. The control program may be executed in a series of execution cycles with batch processing capabilities.

The measured inputs received from a controlled process and the outputs transmitted to the process generally pass through one or more input/output (I/O) modules. These I/O modules serve as an electrical interface between the controller and the controlled process, and may be located proximate or remote from the controller. The inputs and outputs are recorded in an I/O table in processor memory. Input values may be asynchronously read from the controlled process by one or more input modules and output values are written directly to the I/O table by the processor for subsequent communication to the process by specialized communications circuitry. An output module may interface directly with a controlled process, by providing an output from an I/O table to an actuator such as a valve, solenoid, and the like.

During execution of the control program, values of the inputs and outputs exchanged with the controlled process pass through the I/O table. The values of inputs in the I/O table are asynchronously updated from the controlled process by dedicated scanning circuitry. This scanning circuitry may communicate with input modules over a bus on a backplane or network communications. The scanning circuitry also asynchronously writes values of the outputs in the I/O table to the controlled process. The output values from the I/O table are then communicated to one or more output modules for interfacing with the process. Thus, the processor may simply access the I/O table rather than needing to communicate directly with the controlled process.

An industrial controller may be customized to a particular process by writing control software that may be stored in the controller's memory and/or by changing the hardware configuration of the controller to match the control task. Controller hardware configuration is facilitated by separating the industrial controller into a number of control modules, each of which performing a different function. Particular control modules needed for the control task may then be connected together on a common backplane within a rack. The control modules may include processors, power supplies, network communication modules, and I/O modules exchanging input and output signals directly with the controlled process. Data may be exchanged between modules using a backplane communications bus, which may be serial or parallel. A typical hardware modification may involve adding additional I/O modules so as to be able to control additional equipment.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein all modules on the network communicate using a standard communications protocol.

In a typical distributed control system, one or more output modules are provided for interfacing with a process. The outputs derive their control or output values in the form of a message from a master or peer device over a network or a backplane. For example, an output module may receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process.

Conventional output module devices are typically provided an output value solely through network messages, and some may go to a known state or hold the last value upon a network communication fault. For example, the module provides an output according to an output value received in an I/O message from a master (e.g., a PLC), and will maintain that value during normal operation until another message is received or a network communications fault occurs. However, there are many conditions or events for which it may be desirable to provide another output value to the device. Heretofore, the source of an output value was determined according to fixed controller architecture constraints. Thus a user had limited ability to define output device behavior in lieu of regular I/O messages.

SUMMARY OF THE INVENTION

In accordance with the present invention, there is provided a method and apparatus which allows a user to define an output device behavior in a variety of status and/or event circumstances via creating a binding or logical connection between a logic function and one or more status/event indicators. Whereas conventional output devices provided only a limited capability to define output states in the presence of a network communication fault, the present invention provides for user-defined output behavior through linking a logical function with system and module status/event indicators, whereby the output value may be determined according to the status/event indicators and user-defined function blocks.

According to one aspect of the invention, there is provided a method for providing an output value for an output which comprises associating the output with a logic function in communication with a network, associating the logic function with an indicator, and selectively providing an output value to the output from one of the logic function and a network value message, according to the logic function. The logic function may take into account, for example, information relating to the status or health of the output device, network status, and/or the health or status of one or more devices on the network. In this regard, the method may include receiving a status message from the network, receiving a value message from the network, and updating the indicator according to the status message and/or the status of the device.

A status message may comprise information relating to the status of the network and/or other modules or devices on the network, including the value of one or more hardware inputs or outputs. Thus, the method allows a user-defined logic function to take various status and event information into account in setting the output value. In addition to status information, event information may be considered by the logic function in determining the output value. Such event information may include, for example, the occurrence of faults in a system. The invention allows a user to define which status/event indicators will be used by the logic function, and further to define the logic function. In this way, a user has significantly more design flexibility than was possible with conventional output modules.

According to another aspect of the present invention, an output device comprises an output providing an output signal according to an output value, a communication interface adapted to receive messages from a network, an indicator adapted to receive message information from the communication interface and providing indicator data, and a logic unit which receives message information from the communication interface and indicator data from the indicator, and which performs a logic function. The logic unit selectively provides the output value to the output according to either the message information or the logic function.

The logic unit may thus take into account indicator data in determining the output value for the device, which was not previously available. In this regard, the indicator data may include, for example, an I/O connection health indicator, a messaging connection health indicator, an I/O connection error indicator, a run event indicator, and idle event indicator, a network error indicator, an I/O point fault indicator, a hardware input indicator, a hardware output indicator, and I/O data. The device allows a user to define both the status/event indicators which will be considered, as well as the decisional logic used in providing an output value to the output of the device. The logic unit, for example, may comprise a processor or other logic device, which may be configured by a user to perform various functions, such as boolean operations, flip-flops, counters, and/or timers.

According to another aspect of the invention, a method is provided for defining output behavior in an output device, comprising defining a logical function using one or more function blocks, linking the logical function with at least one status/event indicator, and providing an output value according to the logic function and the at least one status/event indicator. The status/event indicator may comprise information relating to the status of one or more devices on a network. This information may include, for example, an I/O connection health indicator, a messaging connection health indicator, an I/O connection error indicator, a run event indicator, and idle event indicator, a network error indicator, an I/O point fault indicator, a hardware input indicator, a hardware output indicator, and I/O data. In addition, defining the logical function using one or more function blocks may comprise, for example, configuring the function blocks to implement one or more of boolean operations, flip-flops, counters, and a timers using a network configuration tool. In this way, a user may program or configure an output device, such as an output module, to perform various logical functions depending on the status of one or more network devices, in order to generate an output value. This method provides the user with significant control system design flexibility not previously possible with conventional output devices.

To the accomplishment of the foregoing and related ends, the invention, then, comprises the features hereinafter fully described. The following description and the annexed drawings set forth in detail certain illustrative embodiments of the invention. However, these embodiments are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
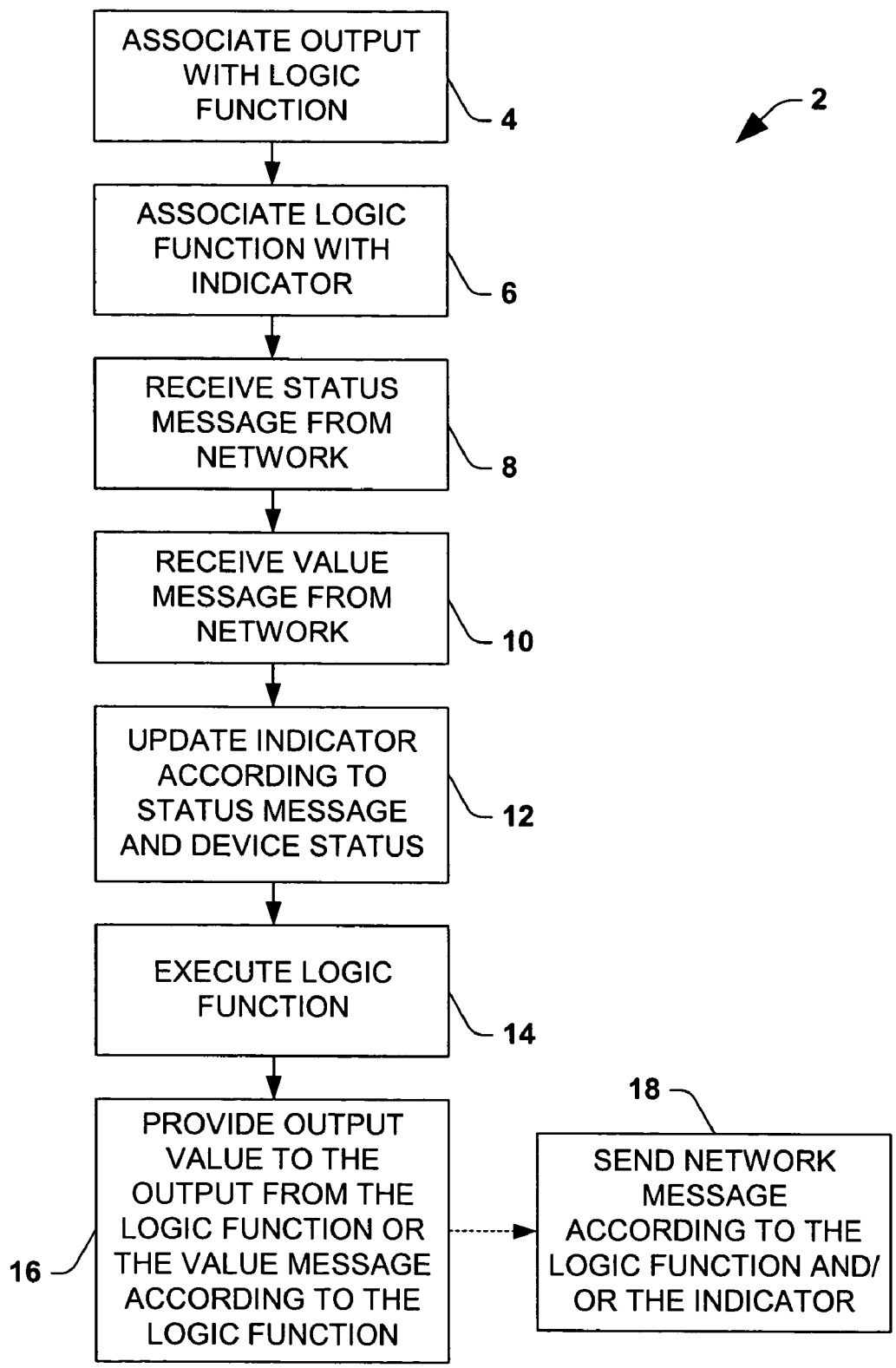
FIG. 1 is a flow diagram illustrating a method of providing an output value for an output device in accordance with the present invention.

The various aspects of the present invention will now be described with reference to the drawings, wherein like reference numerals are used to refer to like elements throughout. The invention provides a method and apparatus for providing an output value in an output device, which allows a user to define a logic function and to associate the logic function with one or more status/event indicators. The logic function then provides an output value to the device output according to the status/event indicators as well as the logic program. This may determine, for example, whether the output value is based on an I/O message received by the device from a network, or based on the logic. As opposed to conventional methods and apparatus, the present invention allows a user to define output device behavior in a variety of circumstances, thereby providing significantly improved design flexibility.

Referring now to the drawings, FIG. 1 illustrates a method 2 of providing an output value for an output device, wherein an output is associated with a logic function at step 4 and the logic function is associated with one or more status/event indicators at step 6. As discussed in greater detail hereinafter, the logic function may be comprised of one or more function blocks, for example, boolean operators, bi-stable functions (e.g., flip-flops), counters, timers, analog functions, etc. The association of the logic function with the indicator at step 6 may be a logical connection (e.g., a binding) in an output module, which a user may accomplish via a configuration tool through a network, as discussed in greater detail infra. The method also comprises receiving status and value messages from the network at steps 8 and 10, respectively, after which the status/event indicators are updated at step 12 according to information received in the status message and further according to the status of the output device. It will be appreciated that a single network message may include both value and status information. In this regard, the network message may include indications of the status of various network devices, for instance, network status, devices status of other modules, etc. The message may also include information about the occurrence of various events, such as faults and the like. In this way, the method maintains situation awareness of a variety of status/event conditions in a distributed control system, which may be taken into account in determining an output value for the output module or device.

The status/event indicator may comprise, for example, a list or table in module memory, whereby a processor in the module may update the information upon receipt of network message, and may access the information in determining an output value in accordance with the user defined logic function. At step 14, the logic function is executed, wherein the associated status/event indications are consulted in determining an output value for the device. Thereafter, the logic function provides an output value to the output at step 16. The logic itself may compute or derive the output value, or the value may be obtained from a network value message (e.g., a typical I/O message), depending on the logic function. Since the logic function itself may be configured to account for one or more of the status/event indications in the indicator, the determination of the output value according to the method 2 provides numerous options for a user in defining the output device behavior. Optionally, a network message may be sent at step 18 according to the logic function and/or the indicator. For example, where an event (e.g., a fault) causes the output value to be derived from the logic function instead of from an I/O message, a user may wish to initiate a network message telling other devices on the network that the output device is changing its control strategy because of the fault.

The method 2, thus allows significantly improved flexibility in defining or configuring distributed control system elements. The method allows an output device or module to be aware of its own situation (e.g., status) as well as the status of other devices on a network and of the occurrence of various events in the system. These indications are associated (e.g., linked or bound) with a user-defined logic function which accounts for these indications in determining the output value for the device.

Figure 2:
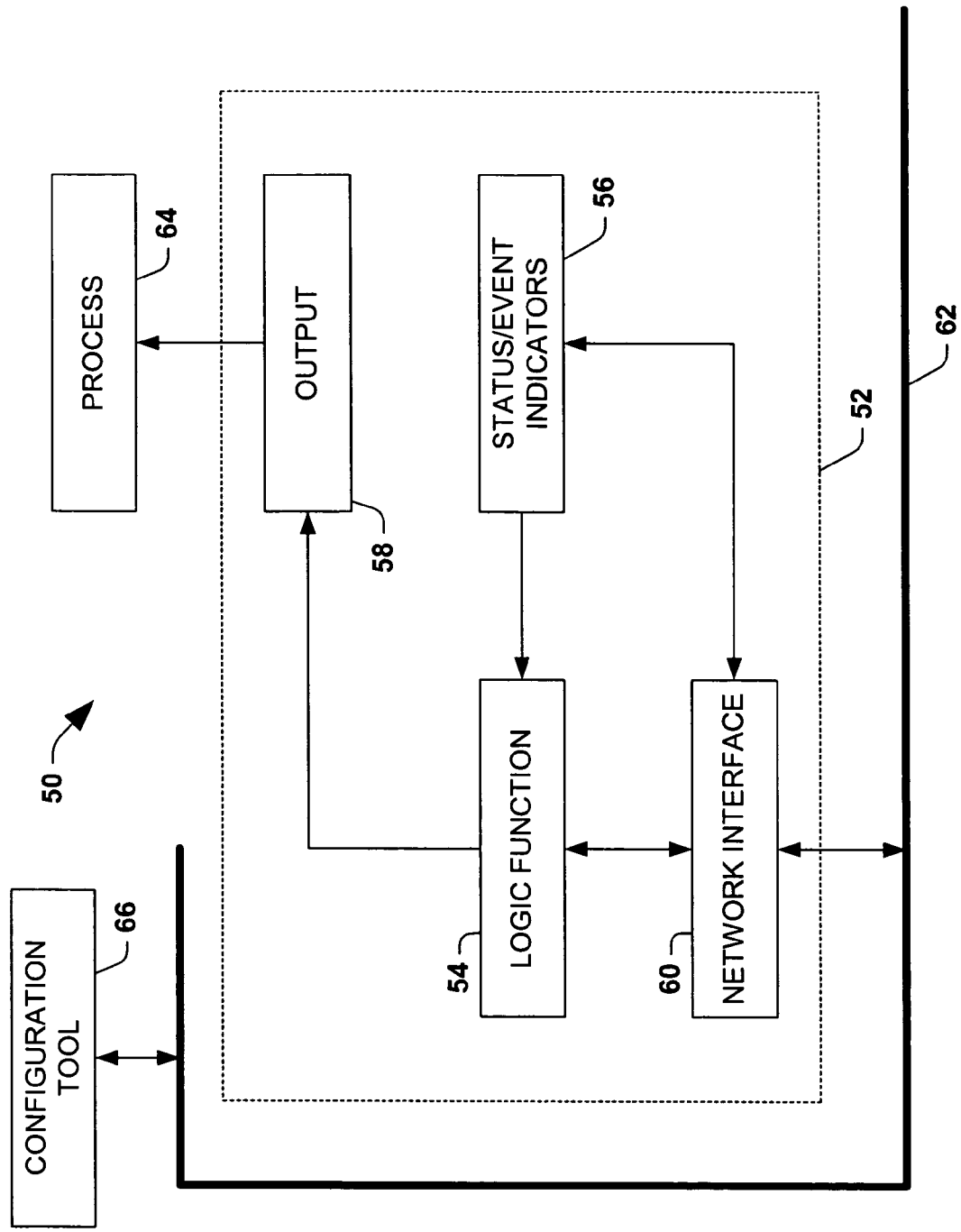
FIG. 2 is a schematic diagram illustrating an output device in accordance with an aspect of the invention.

Referring now to FIG. 2, a system 50 and output device 52 are illustrated, wherein the device 52 is provided with a logic function 54 associated with one or more status/event indicators 56, an output 58, and a network interface 60. The network interface 60 transmits and receives information to and from a network 62, in the form of messages. The messages may be value messages and/or status messages, or the messages may each include both value and status information. The status/event indicators 56 are likewise associated with the network, and thus may receive updated status and/or event information from network messages. The logic function 54 selectively provides an output value to the output 58, which in turn provides an output signal (not shown) to a process 64. By taking into account the status/event indicators 56, the logic function 54 provides the ability to define the behavior of the output 58 in a variety of situations which was not heretofore possible.

The logic function 54 and the association thereof with the status/event indicators 56 in device 52 may be configured via a configuration tool 66 connected to the network 62. For example, a user may define the logic function 54 in terms of various function blocks (e.g., boolean operators, flip-flops, counters, timers, etc.) and create an association between the logic function 54 and the status/event indicators 56 using the tool 66, which may be a computer, workstation, etc. The configuration (not shown) may then be sent by the configuration tool 66 to the output device 52 via one or more messages on the network 62.

Figure 3:
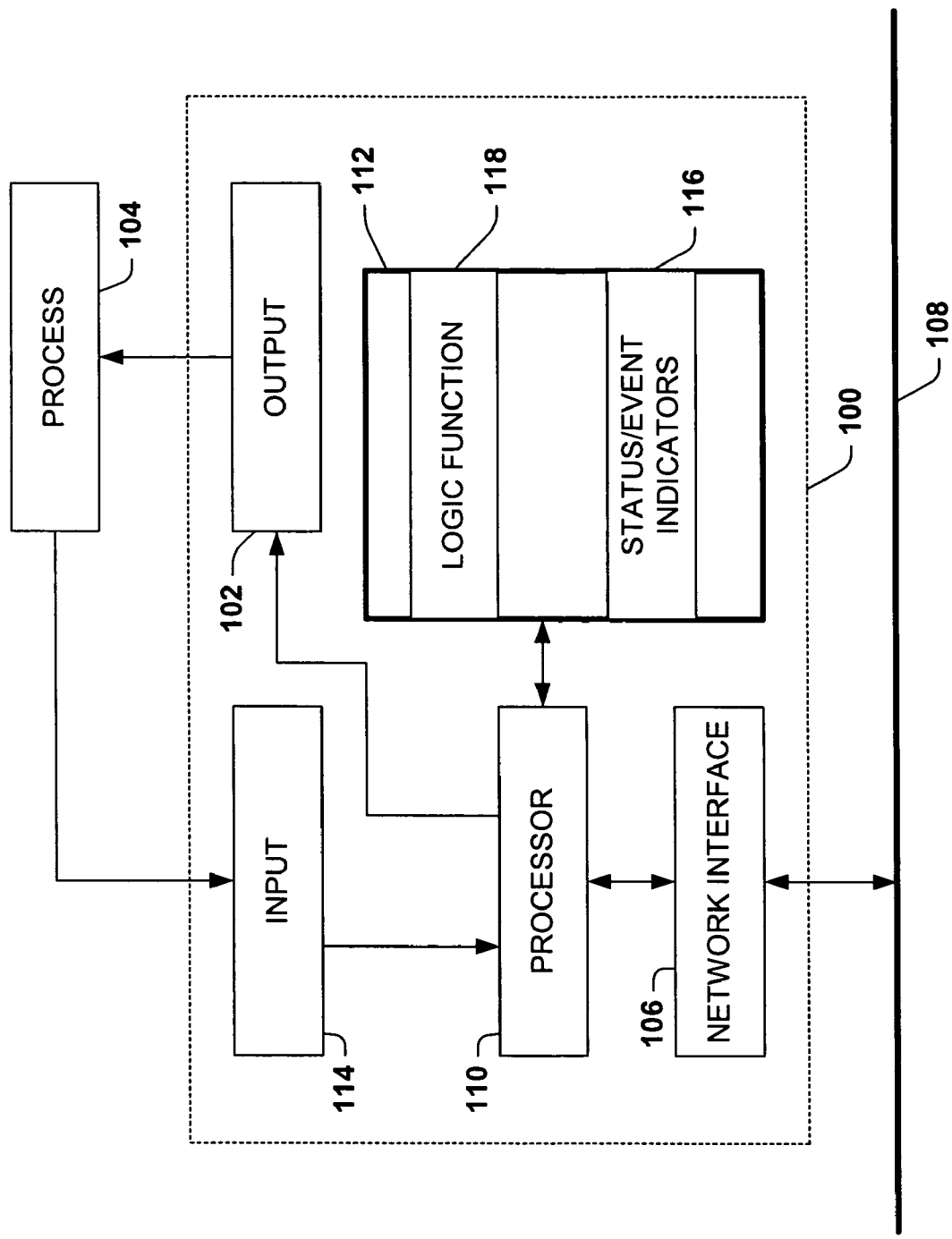
FIG. 3 is a schematic diagram illustrating an output device in accordance with another aspect of the invention.

FIG. 3 illustrates further aspects of the present invention, wherein an output device 100 has an output 102 for providing an output signal (not shown) to a process 104. The device 100 also comprises a communications or network interface 106 providing for transmission and/or receipt of messages to and from a network 108. A processor 110 interfaces with the network interface 106 along with a memory 112 and the output 102. In addition, the device 100 may include one or more inputs 114 for measuring various parameters or variables associated with the process 104. In this regard, the device 100 may be an I/O module. The network 108 may provide communications between the device 100 and one or more other devices connected thereto, such as computers, workstations, other I/O modules, PLCs, and the like (not shown), in order to form a distributed control system. It will be appreciated that the output device 100 may alternatively be connected to other communications mediums, such as, for example a backplane communications bus, and the like, within the scope of the invention.

In this regard, the output device 100 may receive I/O or other types of messages from a master (e.g., a PLC) via the network 108 (or other communications medium) and the network interface 106. These messages may include value and/or status information which are used to update one or more status/event indicators 116 in the memory 112, and/or to provide an output value to the output 102. A user-defined logic function 118 may also reside in the memory 112 for determining an output value for the output 102 according to one or more of the status/event indicators 116.

According to another aspect of the invention, the logic function may be performed or executed by the processor 110 according to program instructions (not shown) within the memory 112. In addition, the processor may update the status/event indicators 116 in the memory 112 according to messages (not shown) received from other network devices via the network 108 and interface 106. The configuration or definition of the logic function 118 as well as the association thereof with one or more of the status/event indicators 116, may be performed by a user via a configuration tool (not shown) through the network 108 and interface 106. The association between the indicators 116 and the logic function 118 may comprise, for example, a binding or linking, whereby the output value determination takes the indicators into account. As discussed in greater detail infra, the logic function 118 may be defined in terms of one or more function blocks (not shown), whereby a user may configure logical or other functions (e.g., boolean operations, flip-flops, timer, counters, and the like) in order to provide an output value (not shown) to the output 102. The logic function 118 may alternatively be implemented be circuitry or components (not shown) other than the processor 110, which may be adapted to provide an output value to the output 102. The behavior of the output 102 may therefore be defined in a variety of event/status situations, providing the user with significant design flexibility not otherwise possible with conventional devices.

Figure 4:
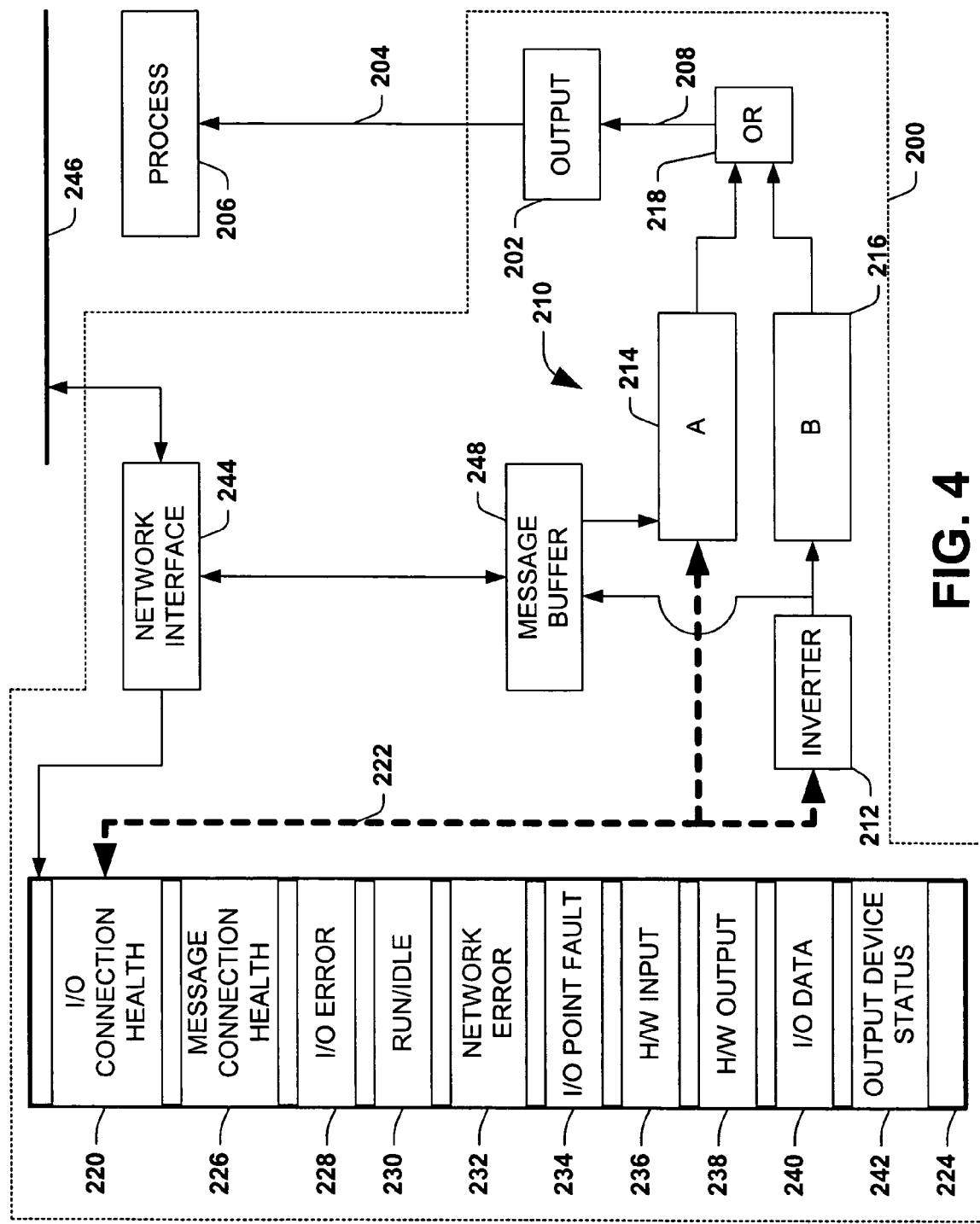
FIG. 4 is a schematic diagram illustrating an exemplary configuration of an output device in accordance with another aspect of the invention.

Referring now to FIG. 4, several aspects of the present invention are illustrated in which an output device 200 comprises an output 202 providing an output signal 204 to a process 206 according to an output value 208 determined by an exemplary logic function 210. The logic function 210 is illustrated as comprising a logical function block 212 (inverter), a function 214 (A), a function 216 (B), and a function block 218 (OR), with the output of the OR function block 218 providing the output value 208 to the output 202. It will be noted that logic function 210 may comprise function blocks (e.g., 212, 218) as well as other functions (e.g., 214, 216).

The inputs of function block 218 are connected to the outputs of functions 214 and 216. The inverter function block 212 and the function 214, are associated with (e.g., bound to) an I/O connection health status/event indicator 220 via a binding 222, with the inverter function block 212 providing a signal to the input of function 216. The indicator 220 is one element in a status/event indicator table or list 224 which further includes a message connection health indicator 226, an I/O error indicator 228, a run/idle indicator 230, a network error indicator 232, an I/O point fault indicator 234, a hardware input indicator 236, a hardware output indicator 238, an I/O data indicator 240, and an output device status indicator 242. It will be appreciated that the status/event indicator list 224 may comprise any number of indicators related to system and/or module status or event information, and is not limited to those illustrated in FIG. 4.

A network interface 244 provides communication capabilities between the output device 200 and a network 246, and may be operatively connected to the status/event indicator list 224 as well as a message buffer 248. As illustrated, the output device 200 may provide an output value 208 according to the logic function 210, based on one or more entries in the status/event indicator list 224. In this way, the behavior of the output 202 may be defined by a user, taking into account the status of any device in a control system, including the status 242 of the output device 200. In the exemplary configuration of FIG. 4, a safety application is illustrated in which control of the output 202 is switched between the functions A 214 and B 216 depending on the health of an I/O connection from a master (not shown), as indicated by the status/event indicator 220.

If the connection is healthy, function A 214 controls the output, for example, by providing the output value 208 according to an I/O message (not shown) received from the network 246 via the interface 244, and provided to function A 214 of the logic function 210 from the message buffer 248. If the I/O connection with the master is faulted, the I/O connection health indicator 220 in list 224 is updated by the network interface 244, and the binding 222 between indicator 220 and logic function 210 causes function B 216 to provide an output value 208 to the output 202 via the OR function block 218.

The function B 216, for example, may implement a controlled shut down of the process 206 due to the I/O connection health fault associated with the master. In addition, the occurrence of such a fault may be configured by a user to trigger transmission of a message to the network 246 via the message buffer 248 and the network interface 244. This may be accomplished in the definition of the logic function 210 by, for example, linking the output of the inverter function block 212 to the message buffer 248 as illustrated in FIG. 4. In this way, the output device 200 may be configured to perform a controlled shutdown of the process 206 according to the event status indicator 220, and to broadcast a message across the network 246 informing one or more devices thereon that a controlled shutdown of the process 206 is underway.

Many different configurations of functions are possible within the scope of the invention, including those not specifically illustrated in the drawings. In addition, many different functions are possible, including but not limited to boolean operators, flip-flops, counters, timers, analog functions, and the like.

Figure 5:
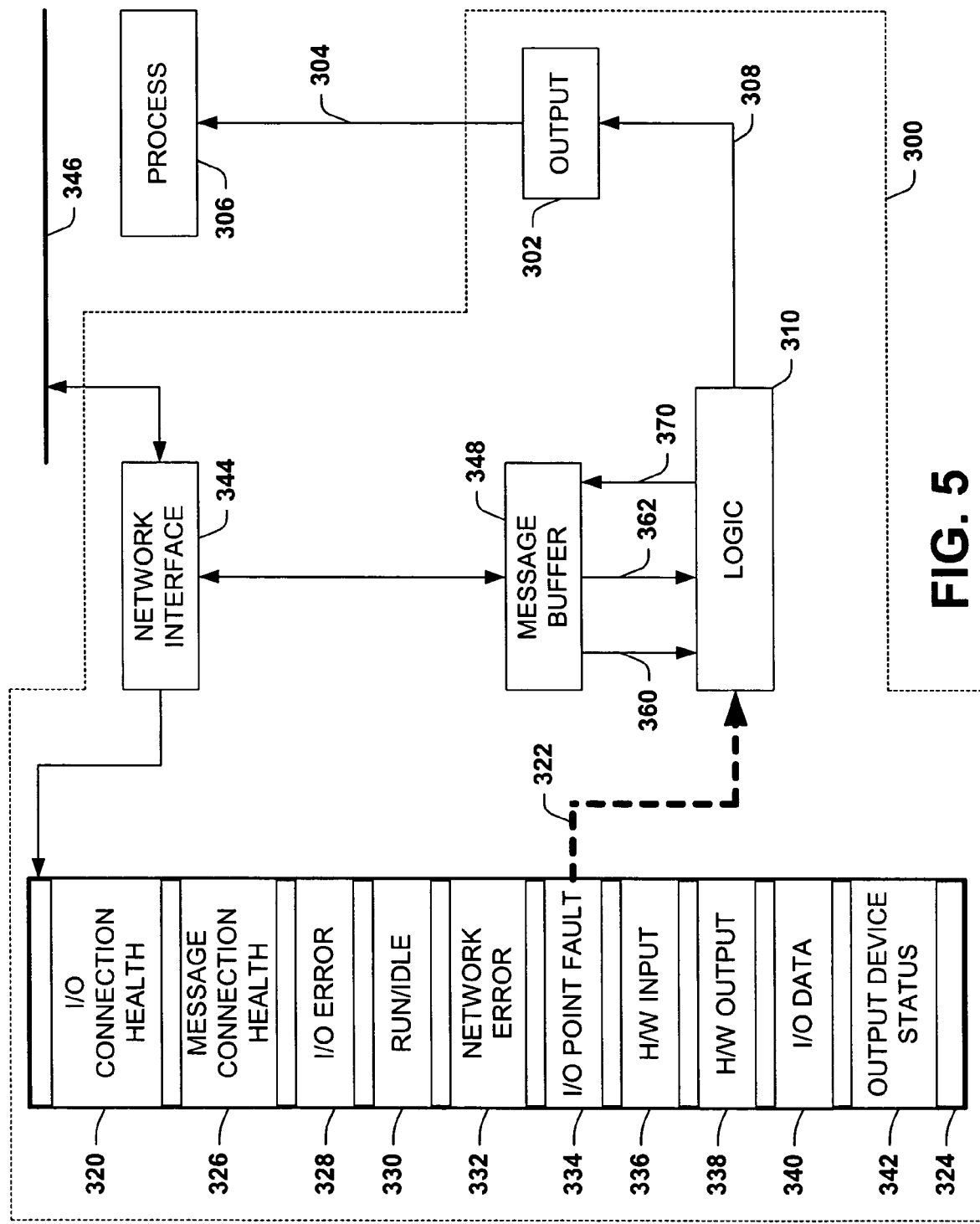
FIG. 5 is a schematic diagram illustrating another exemplary configuration of an output device in accordance with the invention.

Referring now to FIG. 5, another exemplary application of the present invention is illustrated wherein an output device 300 comprises an output 302 providing an output signal 304 to a process 306 according to an output value 308 from a logic unit 310. The logic unit 310 is associated with a list 324 of status/event indicators which comprises an I/O connection health indicator 320, a message connection health indicator 326, an I/O error indicator 328, a run/idle indicator 330, a network error indicator 332, an I/O point fault indicator 334, a hardware input indicator 336, a hardware output indicator 338, an I/O data indicator 340, and an output device status indicator 342. The association between the event/status indicator list 324 and the logic unit 310 comprises a binding 322 which provides an input to the logic unit 310 from the I/O point fault indicator 334. The entries in the status/event indicator list 324 are updated by a network interface 344 according to one or more messages (not shown) from a network 346, which may include, for example, network I/O messages, network status messages, network value messages, etc.

Figure 6:
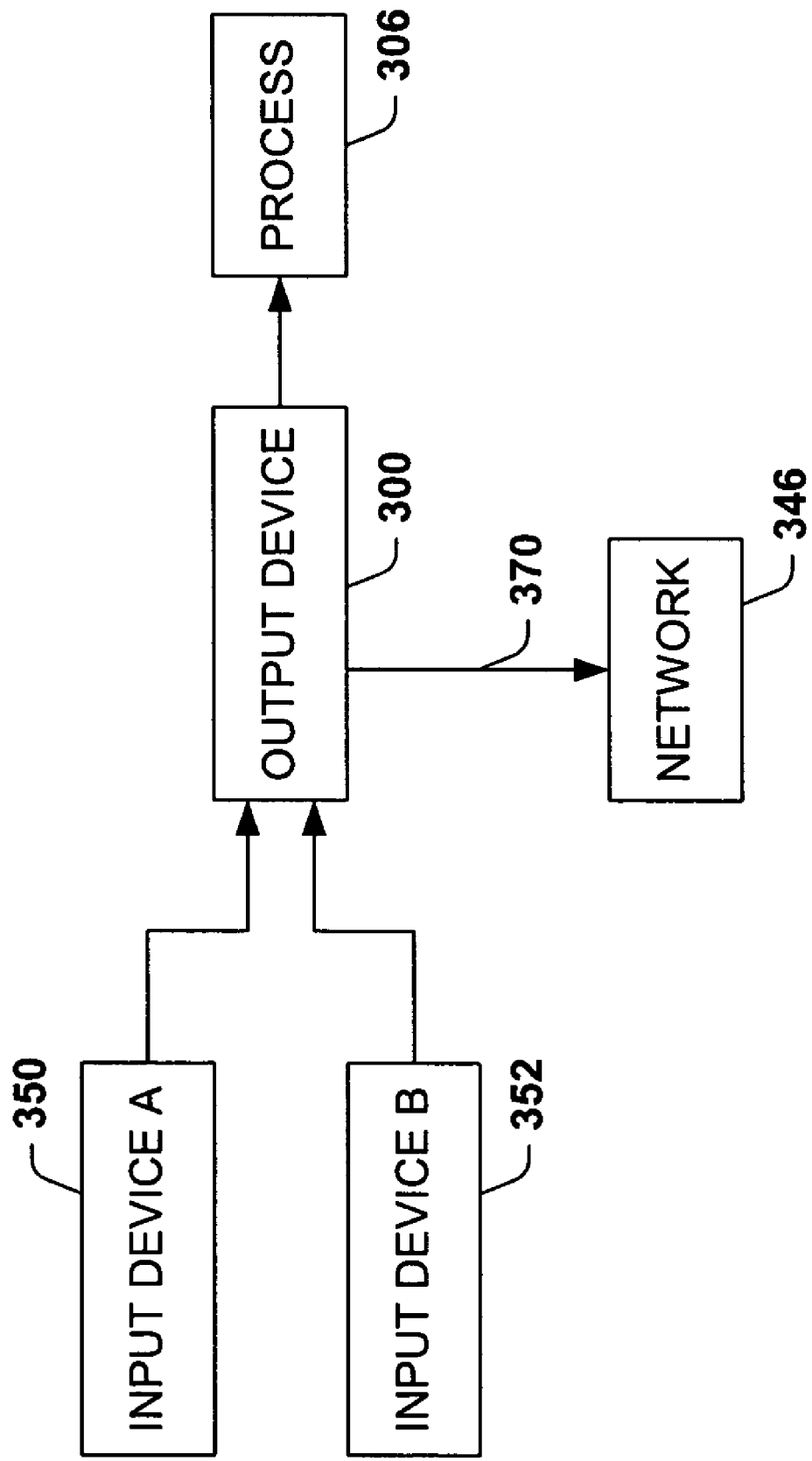
FIG. 6 is a schematic diagram illustrating an exemplary system including an output device in accordance with the invention.

A message buffer 348 provides for transmission and receipt of network messages from and to the logic unit 310. Referring also to FIG. 6, various aspects of the invention are illustrated in an exemplary redundancy application. In this example, two input devices 350 and 352 feed the output device 300, which provides an output signal 304 to the process 306 based thereon. The output device 300 may receive the values 360 and 362, respectively, of the input devices 350 and 352, for example, from the message buffer 348. This may be the case where one or more separate input modules (not shown) on the network 346 provide the values 360 and/or 362. Where the output device 300 is an I/O module, the inputs may be part of the device 300.

The logic unit 310 of output device 300 compares the two input values 360 and 362 before making any decisions. If one of the input devices 350 or 352 were to fail (e.g., device 352), the output device 300 could continue to operate using only input device 350, according to the user defined configuration of the logic unit 310. The failure of an input in this example may be determined according to the I/O point fault indicator 334. The output device 300 can further be configured to send a message 370 from the logic unit 310 to another device (not shown) on the network 346, via buffer 348 and interface 344, to indicate that a fault has occurred in one of the input devices 350 and/or 352.

Furthermore, the logic unit 300 could be configured to continue operation according to one of the redundant input devices 350 or 352 for a predetermined time period after sending the message. In this case, the message 370 could include information that an input device has failed, and the output device 300 will continue to operate according to a single remaining input device for a specified time period. After the time period has expired, the logic unit 310 may be configured, for example, to perform a controlled shut down of the process 306. The output device 300 can thus notify a master controller (e.g., a PLC on the network 346), via message 370, that input device 352 has failed, and that operation with device 350 will continue for a configurable time period. This allows, for example, time for the failed device to be replaced without stopping the process.

It will be appreciated that many configurations and output device behaviors are possible according to the invention, and that the invention is not limited to those illustrated and described herein. For instance, many different logical functions may be implemented by configuring one or more logical function blocks with associations to one or more status/event indicators. In this regard, the function blocks may be boolean operators, flip-flops, counters, timers, etc., and may also include analog functions within the scope of the present invention.

Although the invention has been shown and described with respect to a certain embodiments, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary embodiments of the invention. In this regard, it will also be recognized that the invention includes a system as well as a computer-readable medium having computer-executable instructions for performing the steps of the various methods of the invention.

In addition, while a particular feature of the invention may have been disclosed with respect to only one of several embodiments, such feature may be combined with one or more other features of the other embodiments as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates generating a dynamic output in a state machine, comprising:
    an input component that receives communication, the communication is related to at least one indicator that receives updated status/ event information from the communication; and
    a logic function component that defines a logical function using at least one function block and links the logical function with the indicator to define the behavior of an output and selectively provide an output signal according to the logic function and the at least one indicator.

2. The system of claim 1, the output signal is transmitted to at least one of a process, a machine, a backplane, a bus and a network.

3. The system of claim 1, further comprising a memory component that stores data that is operatively coupled to at least one of the input component, the logic function component and the output component.

4. The system of claim 3, further comprising a processing component that executes instructions within the memory that is operatively coupled to at least one of the input component the output component and the memory component.

5. The system of claim 4, the processor updates the indicator according to the communication.

6. The system of claim 1, further comprising a closed loop component that receives information from the input component that is operatively coupled to the output component to provide feedback control.

7. The system of claim 1, further comprising a configuration tool that creates an association between the logic function component and the at least one indicator.

8. The system of claim 7, the configuration tool further comprising an intelligence component employed to automatically determine an association between the logic function component and the at least one indicator.

9. The system of claim 7, the configuration tool is one of a computer, a workstation, a handheld PC, a tablet PC, a personal digital assistant and a cell phone.

10. The system of claim 1, the indicator is at least one of a message connection health indicator, an I/O error indicator, a run/idle indicator, a network error indicator, an I/O point fault indicator, a hardware input indicator, a hardware output indicator, an I/O data indicator, and an output device status indicator.

11. The system of claim 1, the input component further comprises a message buffer component employed to store at least one message and is operatively coupled to at least one of the input component and the logic function component.

* * * * *

UNITED STATES PATENT AND TRADEMARK OFFICE
CERTIFICATE OF CORRECTION

PATENT NO. : 7,636,866 B2
APPLICATION NO. : 10/771891
DATED : December 22, 2009
INVENTOR(S) : Majcher et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1424 days.

Signed and Sealed this

Ninth Day of November, 2010

David J. Kappos
*Director of the United States Patent and Trademark Office*